(12) United States Patent
Nowlan (10) Patent No.: US 8,998,131 B1
(45) Date of Patent: Apr. 7, 2015

(54) DIFFERENTIAL THROTTLING CONTROL ENHANCEMENT

(71) Applicant: The Boeing Company, Chicago, IL (US)

(72) Inventor: Daniel Ralph Nowlan, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/056,334

(22) Filed: Oct. 17, 2013

(51) Int. Cl.
  *B64C 19/00* (2006.01)
  *B64C 15/12* (2006.01)
  *G05D 1/08* (2006.01)
  *B64D 31/00* (2006.01)

(52) U.S. Cl.
  CPC .............. *B64C 15/12* (2013.01); *G05D 1/0808* (2013.01); *B64D 31/00* (2013.01)

(58) Field of Classification Search
  USPC ................................................. 244/75.1, 76 J
  See application file for complete search history.

(56) References Cited

U.S. PATENT DOCUMENTS

| | | | | |
|---|---|---|---|---|
| 3,070,330 A | * | 12/1962 | Escher | 244/76 J |
| 3,205,820 A | * | 9/1965 | McCorkle, Jr. et al. | 244/3.21 |
| 3,245,620 A | * | 4/1966 | McEwen | 239/265.25 |
| 3,292,865 A | * | 12/1966 | Short et al. | 239/265.25 |
| 3,311,130 A | * | 3/1967 | Caldwell | 137/869 |
| 3,612,442 A | * | 10/1971 | Chisel | 244/3.22 |
| 3,662,973 A | * | 5/1972 | Paine et al. | 244/23 A |
| 3,929,306 A | * | 12/1975 | Faget et al. | 244/159.3 |
| 4,779,821 A | * | 10/1988 | Sutton | 244/52 |
| 5,115,996 A | * | 5/1992 | Moller | 244/12.5 |
| 5,217,188 A | * | 6/1993 | Thole et al. | 244/159.4 |
| 5,799,902 A | * | 9/1998 | Keith et al. | 244/55 |
| 6,041,273 A | * | 3/2000 | Burken et al. | 701/3 |
| 6,105,364 A | * | 8/2000 | Zdybel | 60/228 |
| 6,179,247 B1 | * | 1/2001 | Milde, Jr. | 244/23 A |
| 6,195,981 B1 | * | 3/2001 | Hanley et al. | 60/204 |
| 6,612,522 B1 | * | 9/2003 | Aldrin et al. | 244/2 |
| 6,620,519 B2 | * | 9/2003 | Modi | 428/450 |
| 6,964,154 B1 | * | 11/2005 | Sackheim et al. | 60/224 |
| 8,047,472 B1 | * | 11/2011 | Brand et al. | 244/158.9 |
| 8,727,283 B2 | * | 5/2014 | Morris et al. | 244/171.1 |
| 2005/0178879 A1 | * | 8/2005 | Mao | 244/7 B |
| 2010/0301168 A1 | * | 12/2010 | Raposo | 244/171.2 |
| 2011/0042508 A1 | * | 2/2011 | Bevirt | 244/12.4 |
| 2011/0042510 A1 | * | 2/2011 | Bevirt et al. | 244/12.4 |
| 2011/0168833 A1 | * | 7/2011 | Brothers | 244/12.1 |
| 2012/0042628 A1 | * | 2/2012 | Rosheim | 60/232 |
| 2013/0092799 A1 | * | 4/2013 | Tian et al. | 244/7 R |
| 2013/0340407 A1 | * | 12/2013 | Fisher et al. | 60/204 |

* cited by examiner

*Primary Examiner* — Christopher P Ellis
*Assistant Examiner* — Medhat Badawi
(74) *Attorney, Agent, or Firm* — Michael J. Baldauff, Jr.; Baldauff IP, LLC (57) ABSTRACT

A system for enhancing movement of a multi-engine flight vehicle about either of pitch or yaw axes. The engines are oriented relative the centerline of the flight vehicle and a portion of the engines have a positive tangential cant and the remaining engines have a negative tangential cant. The attitude of the flight vehicle about the pitch, yaw and roll axes is controlled by differentially throttling the multi-engine flight vehicle.

28 Claims, 10 Drawing Sheets

DIFFERENTIAL THROTTLING CONTROL ENHANCEMENT

GOVERNMENT RIGHTS

This invention was made with Government support under contract no. HR0011-12-C-0054 awarded by the Department of Defense. The Government has certain rights in this invention.

TECHNICAL FIELD

The field of the embodiments presented herein is directed toward flight vehicles, and more particularly, to tangentially canting of multiple engines to enhance the amount of control moment about either of the pitch or yaw axes.

BACKGROUND

Rocket propelled flight vehicles typically include mechanisms to provide control of the flight vehicle's orientation (attitude) about its center of gravity (CG). While in flight, the flight vehicle rotates in three dimensions about three axes running through the center of mass of the vehicle. The three angles of rotations are known as roll, pitch and yaw. Most flight vehicles are symmetric about a central longitudinal axis running from nose to tail through the CG. Although the CG is typically referred to when flying in the atmosphere, referencing the CG herein may also be used to refer to the center of mass of vehicles in space when there is effectively no gravity.

Motion about the central longitudinal axis is called roll. A pitch movement is an up or down movement of the nose of the flight vehicle about a lateral axis through the CG. Pitch refers to the orientation about this lateral axis. A yaw motion is a side-to-side movement of the nose of the flight vehicle about a vertical axis through the CG. Yaw is also known as "heading." These flight vehicle rotations are produced by torques or moments about these three axes commonly referred to as the body axes. The body axes may be represented by the letters x, y and z.

Typically thrust vectors of the engines of the flight vehicle are parallel to the centerline of the flight vehicle unless the CG is not along the centerline of the flight vehicle or if slight vehicle roll is desired. When each of the thrust vectors of the flight vehicle's multiple engines are parallel to the flight vehicle's centerline there is no moment about the CG. When engines of the flight vehicle are canted, then the thrust vectors of the canted engines are misaligned relative to the centerline of the flight vehicle. In such cases, however, the engines are canted to instead reduce moments about the CG. For example, some flight vehicles such as the space shuttle have misaligned mass properties relative to the centerline of the flight vehicle. The space shuttle had misaligned mass properties because of the external fuel tank and therefore the space shuttle's engines were canted to reduce the moments about the CG. Flight vehicles with misaligned mass properties may be referred to as asymmetrical flight vehicles. On the other hand, a symmetric flight vehicle has a CG that typically is located on the centerline of flight vehicle.

Some flight vehicles utilize thrust vector control (TVC) to control the trajectory and attitude of a flight vehicle by manipulating the direction of the thrust vector from one or more of the main engines relative to the CG. Thrust vectoring may be accomplished by gimballing the rocket engine. To gimbal, the nozzle of the rocket engine is rotated or swiveled about a pivot point from side-to-side to change the direction of the thrust vector relative the CG of the flight vehicle. Another method of TVC is to change the magnitude of a thrust vector of one engine relative to a thrust vector of one or more of the other engines to change the engine related moment about the CG of the flight vehicle. In both situations, the change in the thrust results in a moment about the centerline that changes the trajectory of the flight vehicle. However, TVC is limited to controlling the trajectory of the flight vehicle rather than controlling the attitude of the flight vehicle with moments. Also, the engines are not fixed relative the centerline of the flight vehicle during flight.

Where the thrust is oriented parallel to the centerline of the flight vehicle (roll axis), roll control is usually obtained by having at least one of the engines canted to impart roll upon the flight vehicle. In flight vehicles that fly outside the atmosphere, TVC is the primary means of control during main engine thrusting because aerodynamic control surfaces are ineffective. Also, on flight vehicles in space or low atmosphere environments when the main engines are not thrusting, moments are usually produced by a reaction control system (RCS) consisting of small rocket thrusters used to apply asymmetrical thrust on the flight vehicle.

However, it is desirable to obtain enhanced maneuverability about the pitch and yaw axes without gimballing of the main engines, or use of RCSs because of the additional costs associated with these systems and their operational use. It is also desirable to enhance pitch and yaw movements without dynamically canting the engines during flight.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a system for providing enhanced control of a flight vehicle about pitch and yaw axes during flight is provided. The system includes a first number of engines of the flight vehicle having a positive tangential cant such that a thrust line from each of the first number of engines is misaligned with a centerline of the flight vehicle in a tangential direction with respect to a circumference of the flight vehicle, and a second number of engines of the flight vehicle having a negative tangential cant such that a thrust line from each of the second number of engines is misaligned with the centerline of the flight vehicle in a tangential direction with respect to a circumference of the flight vehicle and in the opposite direction to the first number of engines. The first and second number of engines are spaced equidistant from one another and from the centerline of the flight vehicle. Each of the first number of engines are alternately positioned relative to each of the second number of engines. The first and second number of engines are configured for differential throttling to control attitude of the flight vehicle about pitch, yaw and roll axes. The positive and negative tangential cants of the first and second number of engines enhance movement of the flight vehicle about one of the pitch and yaw axes.

According to another embodiment disclosed herein, a method for enhancing one of pitch and yaw control of a flight vehicle during flight is provided. The method includes determining a preferred maneuver axis of the flight vehicle. In response to determining a preferred maneuver axis, the method includes configuring a first and second number of engines of the flight vehicle by tangentially canting the first number of engines of the flight vehicle to have a positive tangential cant relative a circumference of the flight vehicle such that thrust lines of the first number of engines are not parallel to the centerline of the flight vehicle and tangentially canting the second number of engines of the flight vehicle to have a negative tangential cant relative a circumference of the flight vehicle and opposite to the first plurality of engines such that thrust lines of the second number of engines are not parallel to the centerline of the flight vehicle. The method further includes differentially throttling the first and second number of engines to control attitude of the flight vehicle about pitch, yaw and roll axes. The method may further include diminishing movement of the flight vehicle about an axis other than the preferred maneuver axis.

In yet another embodiment disclosed herein, a system for providing enhanced control of a flight vehicle about one of the pitch and yaw axes during flight is provided. The system includes a first number of engines of the flight vehicle having a positive tangential cant relative a circumference of the flight vehicle such that thrust lines from the first number of engines are not parallel to the centerline of the flight vehicle and a second number of engines of the flight vehicle having a negative tangential cant opposite to the first plurality of engines such that thrust lines from the second number of engines are not parallel to the centerline of the flight vehicle. The first and second number of engines are alternately positioned relative to one another. The flight vehicle has a center of mass substantially located on the centerline of the flight vehicle. The tangential canting of the first and second number of engines generate a moment partially defined by directional cosines relative the centerline of the flight vehicle and engine centerlines of each of the first and second number of engines. The first and second number of engines are differentially throttled to control attitude of the flight vehicle about pitch, yaw and roll axes, thereby generating enhanced movement of the flight vehicle about one of the pitch and yaw axes and diminished movement of the flight vehicle about the other of the pitch and yaw axes.

According to still yet another embodiment disclosed herein, a system for providing enhanced control of a flight vehicle about either the pitch and yaw axes during flight is provided. The system includes a first engine of the flight vehicle having a first tangential cant such that a thrust line from the first engine is misaligned with a centerline of the flight vehicle in a tangential direction with respect to a circumference of the flight vehicle. The system further includes a second engine of the flight vehicle having a second tangential cant such that a thrust line from each of the second plurality of engines is misaligned with the centerline of the flight vehicle in a tangential direction with respect to a circumference of the flight vehicle. The first and second engines are spaced equidistant from one another and from the centerline of the flight vehicle and are configured for differential throttling to control attitude of the flight vehicle. The first and second tangential cants of the first and second engines are equal but opposite thereby enhancing movement of the flight vehicle about one of the pitch and yaw axes.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following detailed description is directed to flight vehicles having multiple tangentially canted engines where the canted engines are differentially throttled to enhance the amount of control moment about either the pitch or yaw axes. The present invention is susceptible to embodiment in many different forms. There is no intent to limit the principles of the present invention to the particular disclosed embodiments. References hereinafter made to certain directions, such as, for example, "front", "rear", "left" and "right", are made as viewed from the rear of the flight vehicle looking forward. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

Aspects of this disclosure may be used in many types of vehicles such as, for example, aircraft, spacecraft, satellites, underwater rocket propelled mines, missiles, air launched vehicles, vertically launched vehicles and ground launched vehicles. For the sake of simplicity in explaining aspects of the present disclosure, this specification will proceed utilizing a flight vehicle 10 as the primary example. However, as will be seen, many of aspects of the present disclosure are not limited to any particular type of vehicle.

Figure 1:
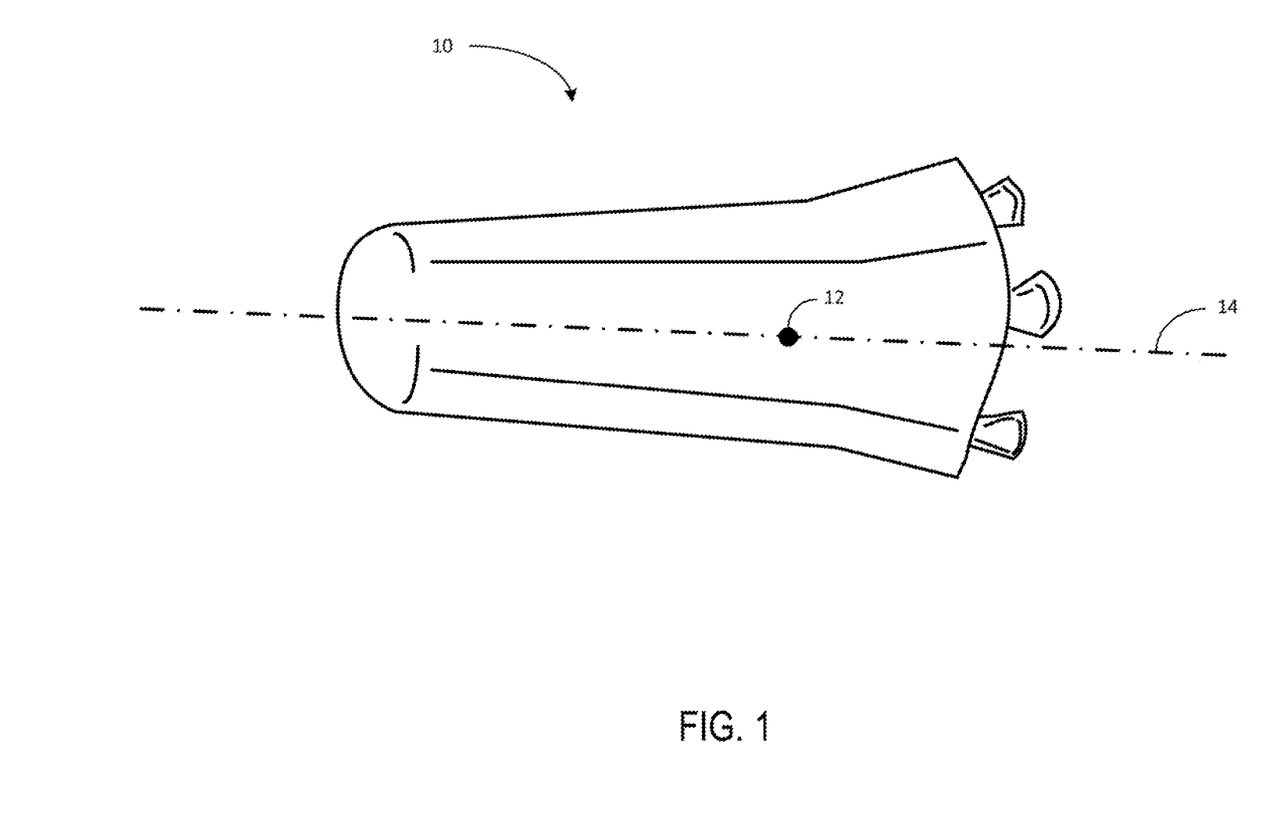
FIG. 1 illustrates a perspective view of one embodiment of a flight vehicle having a center of gravity along a centerline and forward of the rear end mounted engines according to at least one embodiment disclosed herein.

As well understood by those skilled in the art, an exemplary flight vehicle 10 is depicted in FIG. 1. The flight vehicle 10 includes an elongated fuselage and may have any number of engines. The engines may be placed on one end of the flight vehicle such as on the back end or mounted somewhere along the length of the fuselage on the outer periphery of the flight vehicle 10. As shown in FIG. 1, the flight vehicle has a center of gravity (CG) 12 preferably along a vehicle centerline 14. The centerline 14 may sometimes be referred to as a longitudinal axis 14 of the flight vehicle 10.

Figure 2:
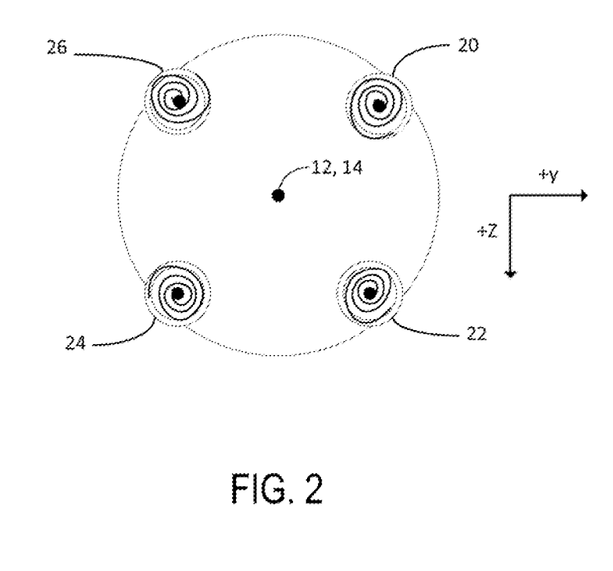
FIG. 2 illustrates one embodiment of multiple engines radially displaced from the centerline and spaced equidistant apart according to at least one embodiment disclosed herein.

FIG. 2 illustrates an end view of one embodiment of the flight vehicle 10 with four engines 20, 22, 24 26 on one end of the flight vehicle 10. Preferably, the engines 20, 22, 24, 26 are radially displaced from the centerline 14 and spaced equidistant apart from one another. In one or more configurations, the engines 20, 22, 24, 26 are fixed relative to the centerline 14 of the flight vehicle 10. Engine 20 is in the upper right, engine 22 is in the lower right, engine 24 is in the lower left, and engine 26 is in the upper right. Engines 20, 22, 24 and 26 are sometimes referred to as engines 1, 2, 3, and 4, respectively.

FIG. 2 alternatively could depict the engines 20, 22, 24, 26 mounted along the length of the fuselage of the flight vehicle 10 and forward of the CG 12. In such case, the engines 20, 22, 24, 26 would be radially displaced further from the centerline 14 on the outer periphery of the fuselage of the flight vehicle 10 so that the plumes from the engines 20, 22, 24, 26 do not interfere with the fuselage of the flight vehicle 10. In either case, the plume of the engines 20, 22, 24, 26 in FIG. 2 are directed rearward and opposite to the flight vehicle's direction of travel. 14. Therefore, one aspect of the disclosure is that the engines 20, 22, 24, 26 may be forward or behind the center of mass of the flight vehicle 10.

The engines 20, 22, 24, 26 are primarily depicted just as nozzles with a pivot point 32. Each pivot point 32 is sometimes referred to as vertex and collectively the pivot points 32 may be referred to as vertices. As well understood by those skilled in the art, the nozzles may be configured differently and each of the engines 20, 22, 24, 26 includes additional components.

Figure 3:
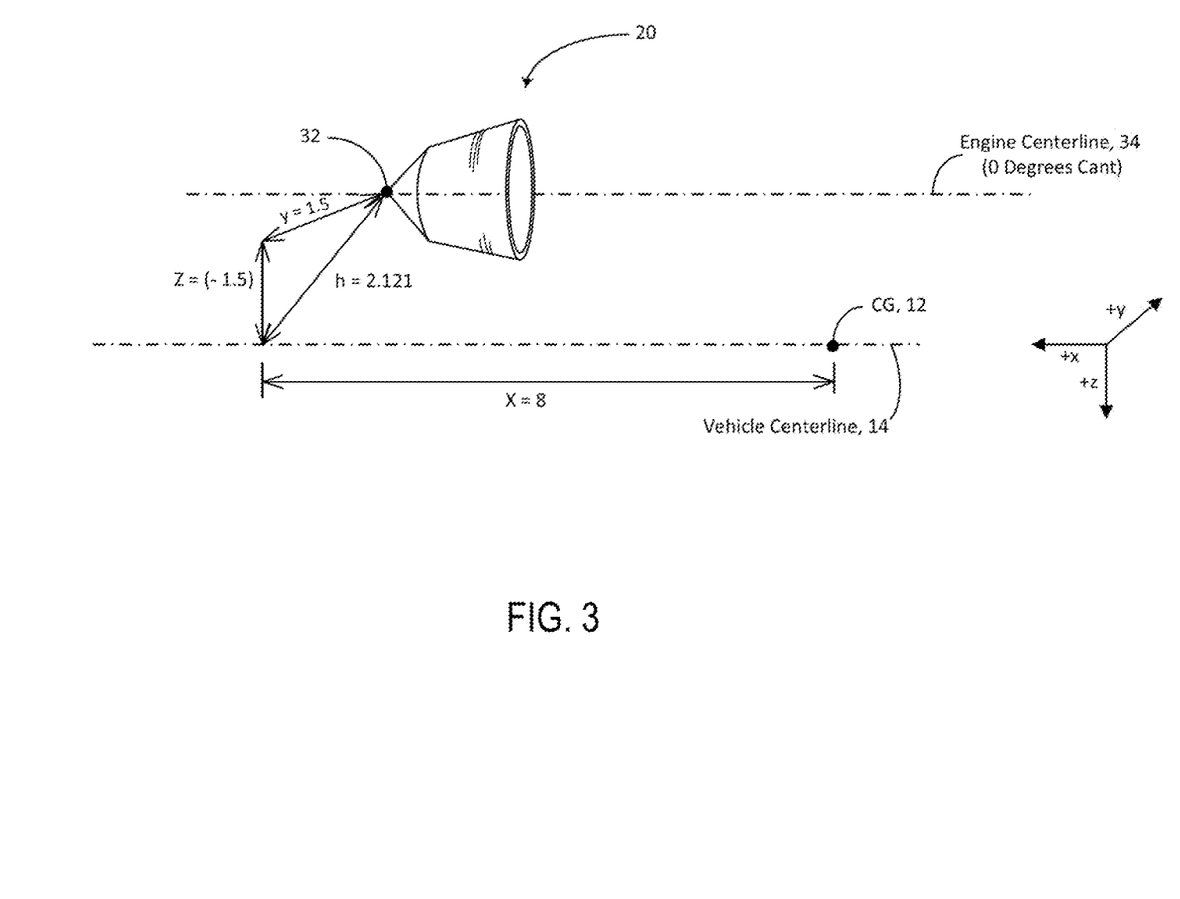
FIG. 3 illustrates a perspective view of one of the engines uncanted and having an engine centerline substantially parallel to the centerline of the flight vehicle according to at least one embodiment disclosed herein.

FIG. 3 illustrates a perspective view of a particular one of the engines 20, 22, 24, 26 radially displaced from the centerline 14 of the flight vehicle 10 and in a particular location along the x, y, and z axes. The location of each of engines 20, 22, 24, 26 is based upon the particular configuration and requirements of the flight vehicle 10. For example, the engine depicted in FIG. 3 corresponds with engine 20 in the upper right because it has a positive y coordinate and a negative z coordinate. Because the engine 20 is uncanted about its pivot point 32, the engine centerline 34 of the engine 20 is parallel with the centerline 14 of the flight vehicle 10. In this example, the location of the engine centerline 34 is simply based on distances along the x, y and z axes.

Figure 4:
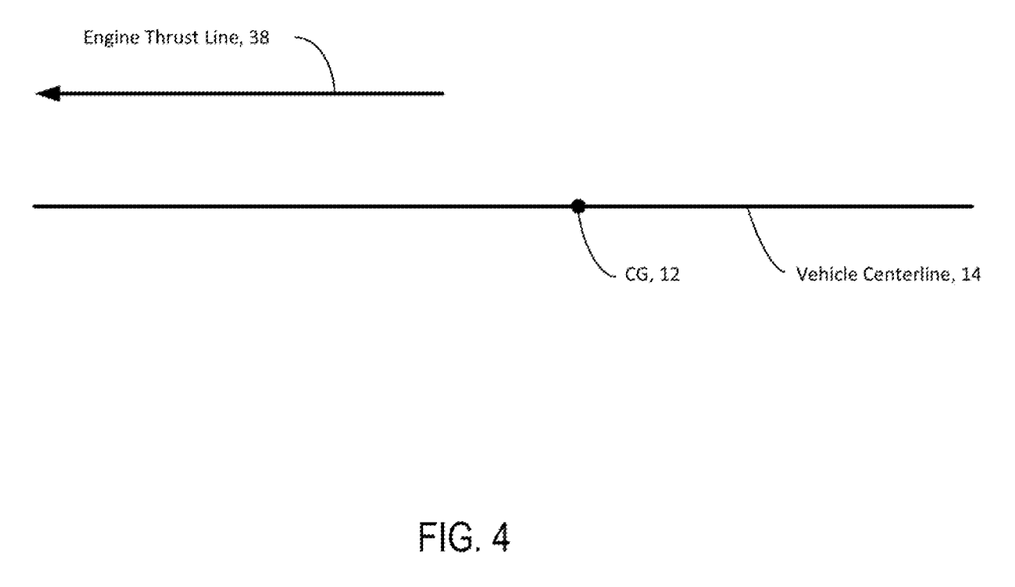
FIG. 4 illustrates the thrust line of the engine of FIG. 3 relative to the centerline of the flight vehicle according to at least one embodiment disclosed herein.

For example, if the pivot point 32 of the engine 20 were radially spaced a distance h of about 2.121 feet from the centerline 14 of the flight vehicle 10, then the pivot point 32 of engine 20 would be spaced 1.5 feet along the negative z-axis and 1.5 feet along the positive y-axis. Also, assume for this example, that the pivot point 32 of the engine 20 is positioned 8 feet forward of the CG 12 along the positive x-axis. When the engines 20, 22, 24, 26 are oriented directly rearward as shown in FIG. 3, their thrust vectors are oriented substantially parallel to the centerline 14 of the flight vehicle 10. FIG. 4 illustrates the engine thrust line 38 of the engine 20 parallel to the centerline 14 of the flight vehicle 10 because the engine 20 is uncanted.

Referring back to FIG. 2 with the uncanted engines 20, 22, 24, 26, the pivot points 32 of engines 20, 26 may be aligned horizontally with each other above the centerline 14 and the pivot points 32 of engines 22, 24 may be aligned horizontally with each other below the centerline 14. A horizontal line between the pivot points 32 of the two engines 20, 26 may be substantially parallel with a horizontal line between the pivot points 32 of the two engines 22, 24. One or both of the engines 20, 26 may be throttled differently than one or both of the engines 22, 24 to cause the flight vehicle 10 to maneuver about the pitch axis. For example, if the lower two engines 22, 24 have more throttle than the upper two engines 20, 26 then the flight vehicle 10 will pitch up.

Also, the pivot points 32 of engines 20, 22 may be aligned vertically with each other and the pivot points 32 of the engines 24, 26 may be aligned vertically with each other. A vertical line between the pivot points 32 of the engines 20, 22 may be substantially parallel with a vertical line between the pivot points 32 of the engines 24, 26. One or both of the engines 20, 22 may be throttled differently than one or both of the engines 24, 26 to cause the flight vehicle 10 to maneuver about the yaw axis. For example, if the left engines 24, 26 have more throttle than the right engines 20, 22 then the flight vehicle 10 will head to the right as viewed from the rear of the vehicle looking forward.

Figure 5A:
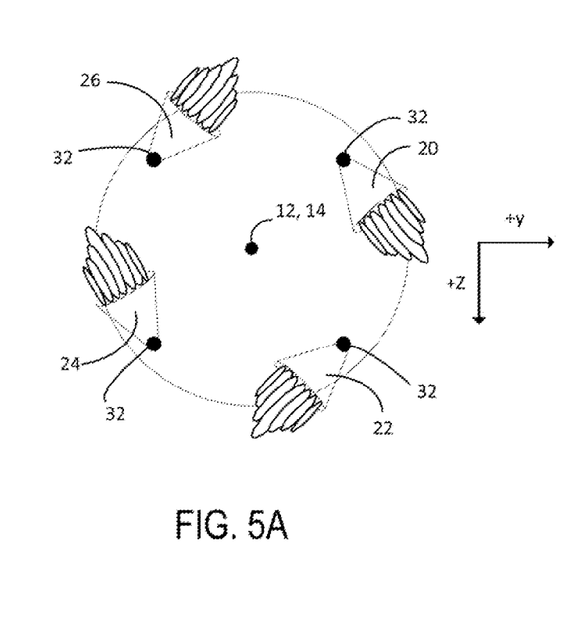
FIG. 5A illustrates one embodiment of multiple engines configured with a positive tangential cant according to at least one embodiment disclosed herein.

FIG. 5A is similar to FIG. 2 except that the engines 20, 22, 24, 26 are each rotated or pivoted about their pivot point 32. The pivoting of the engines 20, 22, 24, 26 relative the circumference of the flight vehicle 10 may be referred to as "tangential canting" or merely as "canting" but for the purposes of this disclosure should be otherwise distinguishable from merely "radial" canting. Also, for purposes of describing aspects of the disclosure, one or more of the figures may depict the engines 20, 22, 24, 26 canted all the way over to about ninety degrees. However, as well understood by those skilled in the art, the engines 20, 22, 24, 26 would not realistically be canted over that far. With a cant angle of ninety degrees, the engines 20, 22, 24, 26 would impart a counterclockwise roll on the flight vehicle 10 which is not intended by the present disclosure. As described in greater detail below, the engines 20, 22, 24, 26 are preferably canted only a few degrees which is difficult to clearly depict in the figures of this disclosure. In one or more configurations, it may be desirable to enhance pitch and yaw movements without dynamically canting the engines during flight.

Figure 5B:
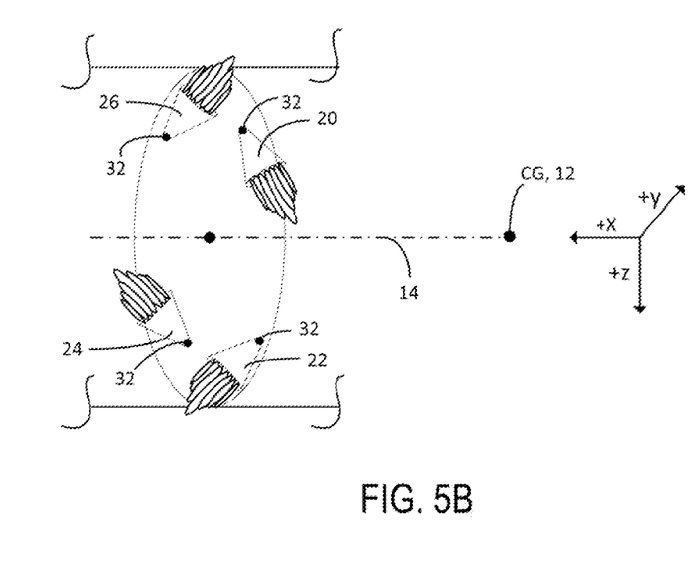
FIG. 5B is a perspective view of the configuration of engines with the positive tangential cant of FIG. 5A where the engines are forward of the center of gravity according to at least one embodiment disclosed herein.

FIG. 5B is a perspective view corresponding with the orientation of the canted engines 20, 22, 24, 26 shown in FIG. 5A. FIG. 5B illustrates the location of each of the engines 20, 22, 24, 26 forward of the CG 12 as well as their location relative the centerline 14. The roll, pitch, and yaw axes of the flight vehicle 10 correspond with the x, y and z axes, shown in FIG. 5B, at the CG 12. Therefore, the location of the engines 20, 22, 24, 26 can be expressed in terms of distances relative the x, y and z axes. In this configuration, the engines 20, 22, 24, 26 are canted about pivot points 32 and the engine centerline 34 of each engine 20, 22, 24, 26 is misaligned with the centerline 14 of the flight vehicle 10. The orientation of the engine centerline 34 of each of the canted engines 20, 22, 24, 26 relative to the centerline 14 of the flight vehicle 10 is expressed in terms of directional cosines. The directional cosines of each engine centerline 34 are the cosines of the angles between each engine centerline 34 and the three coordinate axes.

Figure 6A:
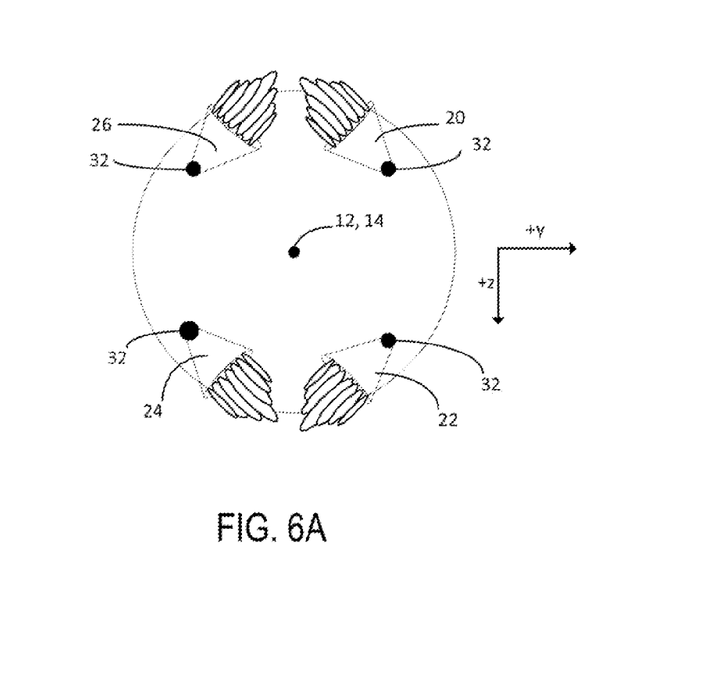
FIG. 6A illustrates one embodiment of the multiple engines where a pair of engines have a positive tangential cant and the other pair of engines have a negative tangential cant according to at least one embodiment disclosed herein.
Figure 6B:
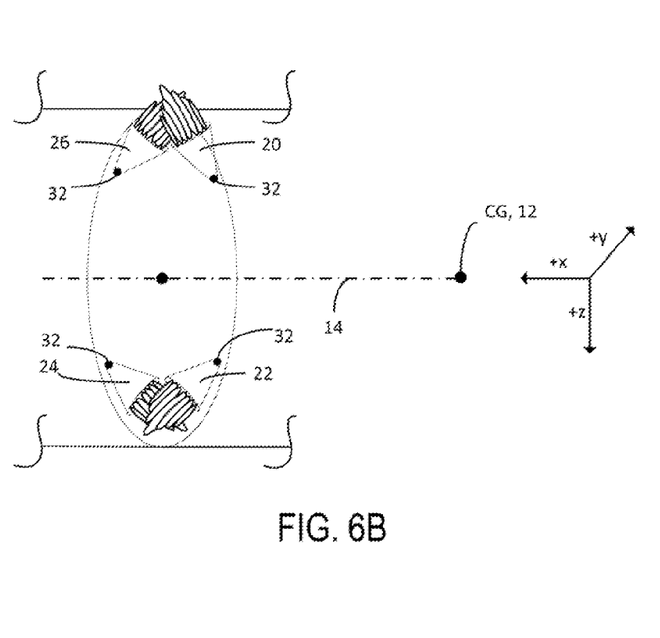
FIG. 6B is a perspective view of the configuration of a pair of engines with a positive tangential cant and the other pair of engines having a negative tangential cant where both pairs of engines are forward of the center of gravity according to at least one embodiment disclosed herein.

In FIGS. 5A and 5B, the engines 20, 22, 24, 26 are all canted in the same direction and may be referred to as having a positive polarity or being positively canted. FIG. 6A is similar to FIG. 5A in illustrating canted engines 20, 22, 24, 26 but engines 20, 24 are canted in the opposite direction. FIG. 6B is a perspective view corresponding with the orientation of the canted engines 20, 22, 24, 26 shown in FIG. 6A. In FIGS. 6A and 6B, engines 20, 24 are flipped 180 degrees into the opposite direction relative to the other two canted engines 22, 26 and therefore may be referred to as having a negative polarity or being negatively canted. Preferably, when all engines 20, 22, 24, 26, are at the same thrust levels, the positive and negative canting of engines 20, 22, 24, 26 are matched with or balanced against each other to counteract roll about the centerline 14 of the vehicle 10. The positive and negative tangential cants of the first and second number of engines counteract one another to substantially eliminate movement of the flight vehicle about the roll axis.

Figure 7A:
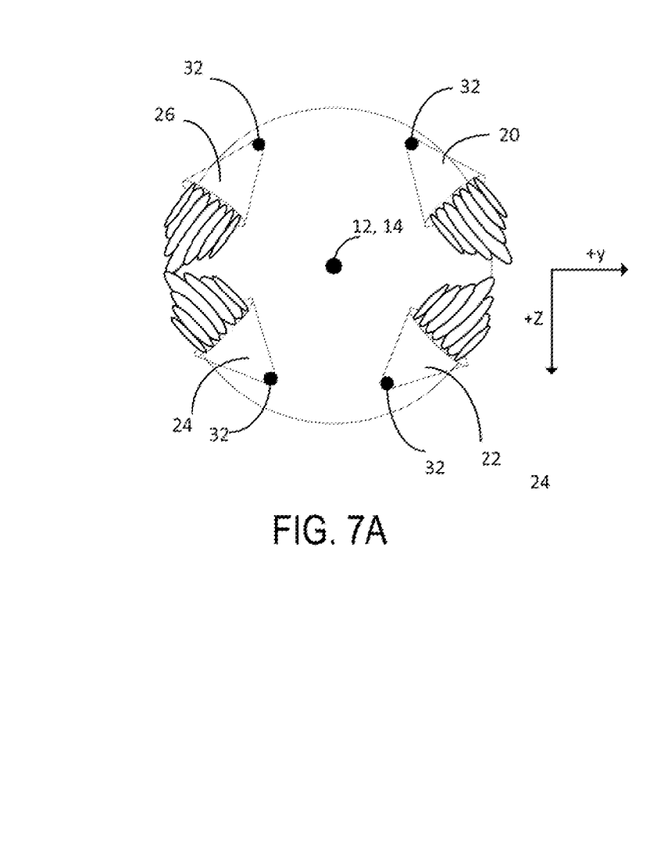
FIGS. 7A and 7B are similar to FIGS. 6A and 6B except that engine polarities of each pair of engines have been flipped according to at least one embodiment disclosed herein.
Figure 7B:
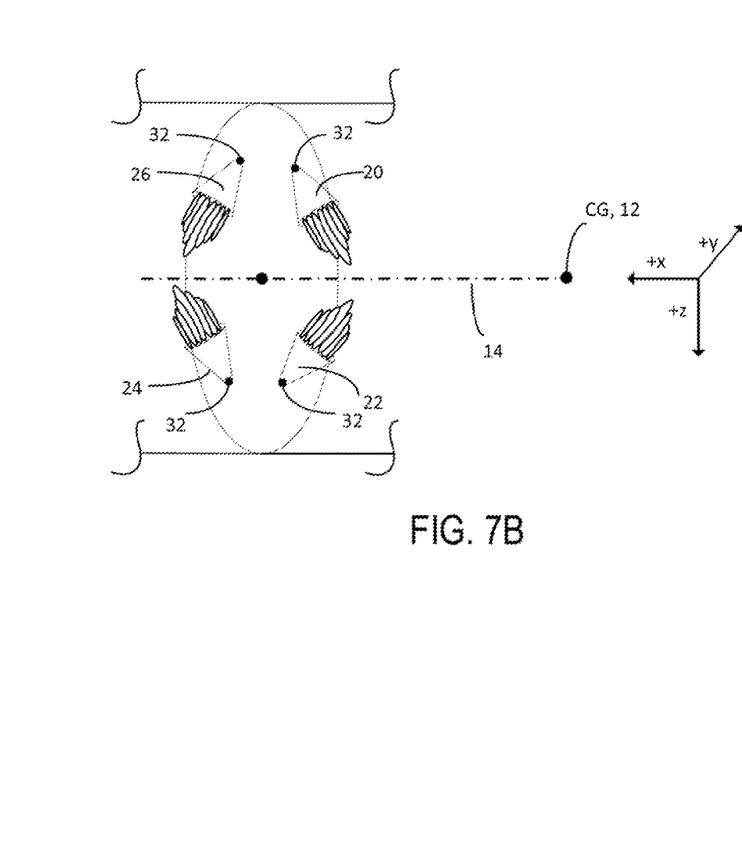

FIG. 7A is also similar to FIG. 5A in illustrating canted engines 20, 22, 24, 26 but engines 22, 26 are instead canted in the opposite direction. FIG. 7B is a perspective view corresponding with the orientation of the canted engines 20, 22, 24, 26 shown in FIG. 7A. In FIGS. 7A and 7B, engines 22, 26 are flipped 180 degrees into the opposite direction relative to the other two canted engines 20, 24 and in such case are referred to as having a negative polarity or being negatively canted. Therefore, in FIGS. 7A and 7B, engines 20, 24 have a positive polarity or a positive cant that opposes engines 22, 26.

In one or more configurations for controlling the attitude of the flight vehicle 10 with differential throttling, the two lower engines, engines 22 and 24, may have a first thrust level but different polarities relative to each other. Also, the two upper engines, engines 20 and 26, may have a second thrust level but different polarities relative to each other. One of the lower engines 22, 24 may have a negative cant along with one of the upper engines 20, 26 and the other of the lower engines 22, 24 may have a positive cant along with the other of the upper engines 20, 26. In one or more other configurations, the two right engines, engines 20 and 22, may have a first thrust level but different polarities relative to each other. The two left engines, engines 24 and 26, may have a second thrust level but different polarities relative to each other. One of the right engines 20, 22 may have a negative cant along with one of the left engines 24, 26 and the other of the right engines 20, 22 may have a positive cant along with the other of the left engines 24, 26. Thus, the engines 20, 22, 24, 26 that could have the same thrust level to alter the attitude of the flight vehicle 10 have opposite polarities.

The polarities of each of the engines 20, 22, 24, 26 based on either the configuration shown in FIGS. 6A and 6B or on the configuration shown in FIGS. 7A and 7B are summarized in Table 1 below. As explained above, engines 20, 22, 24, 26 may be referred to as engines 1, 2, 3, 4, respectively.

TABLE 1

|  | Engine 1 | Engine 2 | Engine 3 | Engine 4 |
| --- | --- | --- | --- | --- |
| FIGS. 6A & 6B | − | + | − | + |
| FIGS. 7A & 7B | + | − | + | − |

Figure 8:
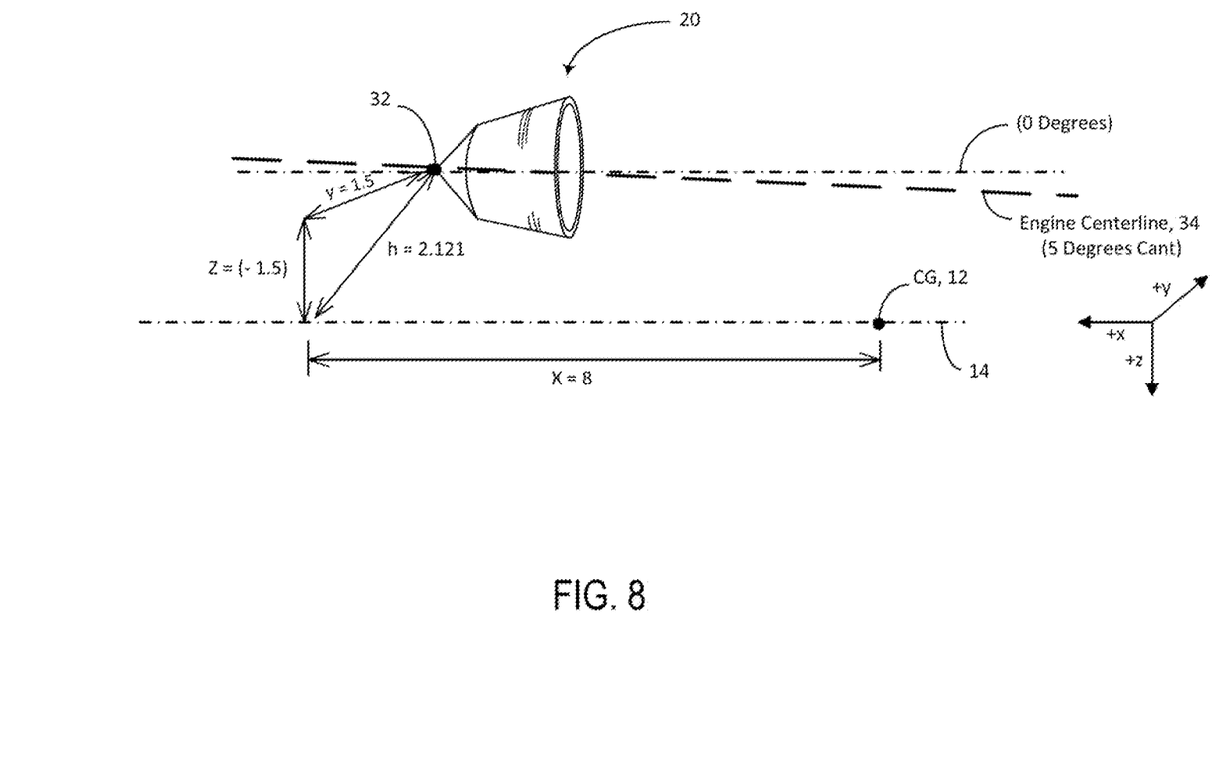
FIG. 8 illustrates a perspective view of one of the engines of either the configuration of FIGS. 6A and 6B or the configuration of 7A and 7B where the engine is canted such that the engine centerline is misaligned with the centerline of the flight vehicle according to at least one embodiment disclosed herein.

The particular location of the canted engine 20 is expressed in terms along the three coordinate axes. For example, FIG. 8 illustrates a perspective view of one configuration of the engine 20 canted and radially displaced from the centerline 14 of the flight vehicle 10. The engine depicted in FIG. 8 corresponds with engine 20 in the upper right having a positive y coordinate and a negative z coordinate. In this configuration, the engine 20 is canted about its pivot point 32 and the engine centerline 34 of the engine 20 is misaligned with the centerline 14 of the flight vehicle 10. The orientation of the engine centerline 34 of the canted engine 20 relative to the centerline 14 of the flight vehicle 10 may be expressed in terms of directional cosines. The directional cosines of the engine centerline 34 are the cosines of the angles between the engine centerline 34 and the three coordinate axes.

Figure 9:
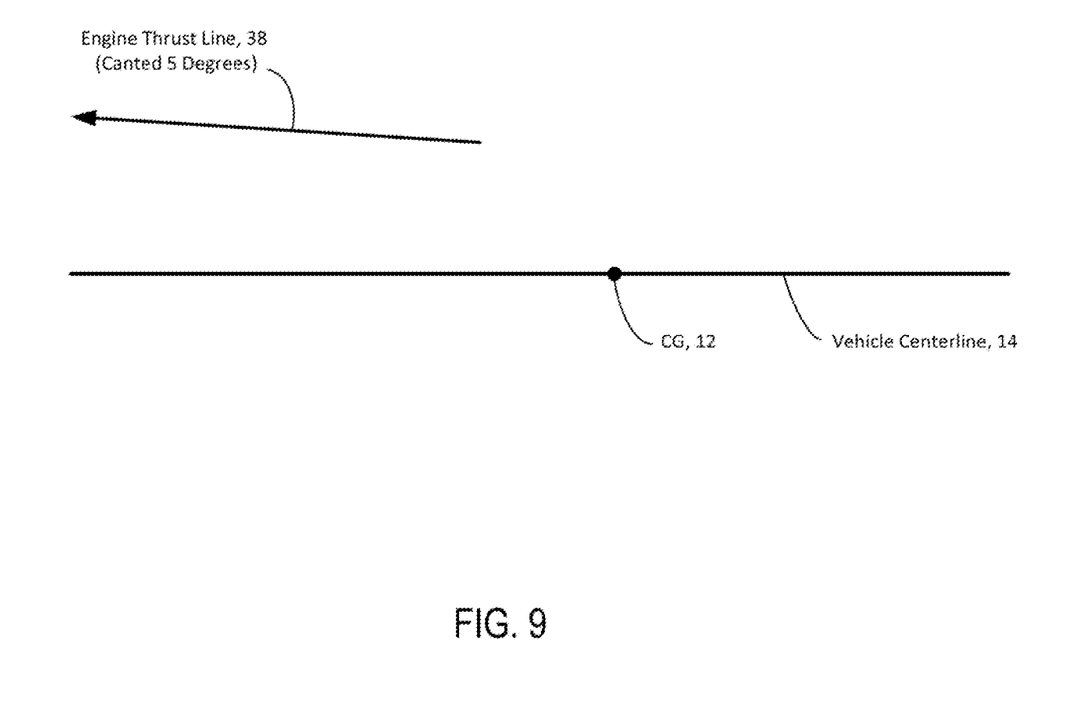
FIG. 9 illustrates the thrust line of the engine of FIG. 8 relative to the centerline of the flight vehicle according to at least one embodiment disclosed herein.

Because the pivot point 32 of the engine 20 is radially spaced a distance h of about 2.121 feet from the centerline 14 of the flight vehicle 10, the pivot point 32 of engine 20 is spaced 1.5 feet along the negative z axis and 1.5 feet along the positive y axis. Also, in this example, the pivot point 32 of the engine 20 is positioned 8 feet forward of the CG 12 along the positive x axis. When the engine 20 is nominally canted about 2 degrees to about 10 degrees, the engine centerline 34 of engine 20 is misaligned with the centerline 14 of the flight vehicle 10 by about 2 to about 10 degrees. In one or more configurations, as illustrated in FIG. 8, the cant of each of the engines 20, 22, 24, 26 is about 5 degrees. As a result of the 5 degree cant, the engine thrust line 38 of the engine 20 is also misaligned with the centerline 14 of the flight vehicle 10 by 5 degrees as shown in FIG. 9. Only a nominal amount of engine canting, such as about 2 to about 10 degree, is preferred because it is not desirable to move the engine thrust lines 38 too much more from the centerline 14 of the flight vehicle 10. If the engine centerline 34 of each engine 20, 22, 24, 26 are misaligned much more than about 10 degrees additional propellant wound be required for the flight vehicle 10 and the additional weight would eliminate the benefit of having enhanced control moment. In one or more configurations, the cant of the engines 20, 22, 24, 26 remains fixed during flight. In one or more other configurations, the engines 20, 22, 24, 26 are dynamically canted during flight.

A certain level of differential throttling of the engines 20, 22, 24, 26 is required to produce a given level of control moment about a pitch or yaw maneuver axis. More desired moment requires more throttling. As engine throttling levels increase, engine design complexity increases which is undesirable. However, nominal tangential canting of the engines 20, 22, 24 26 as explained above enhances maneuver axis control leading to less required engine throttling. In other words, for the same level of differential throttling the flight vehicle 10 with nominally canted engines 20, 22, 24, 26 receives more moment control about either of the pitch and yaw axes. Therefore, the canted engines 20, 22, 24, 26 do not have to be differentially throttled as much, with only nominal difference in thrust levels between pairs of the fixed cant engines 20, 22, 24, 26, to get the same control moment the flight vehicle 10 would have had when the engines 20, 22, 24, 26 were uncanted. Therefore, appropriate selection of the tangential canting can significantly enhance the primary maneuver axis (either pitch or yaw) attitude control whether roll control is desired or not.

In one or more configurations, at least one of a first plurality of engines and at least one of a second plurality of engines are configured to operate at a first thrust level and at least one other of the first plurality of engines and at least one other of the second plurality of engines are configured to operate at a second thrust level that is different from the first thrust level. The flight vehicle 10 performs at a level of maneuverability about either of the pitch and yaw axes with the first plurality of engines having the positive tangential cants and the second plurality of engines having the negative tangential cants. The first and second plurality of engines, if without the positive and negative tangential cants, would require more thrust than either one or both of the first and second thrust levels for the flight vehicle 10 to perform at the same level of maneuverability about either of the pitch and yaw axes.

While differential throttling of the uncanted engines 20, 22, 24, 26 can itself be used to control the trajectory of the flight vehicle 10, the two engine configurations shown in FIGS. 6A-6B and 7A-7B, with their corresponding engine polarities as described above, provide enhanced roll along with either pitch or yaw attitude for the flight vehicle. In other words, enhanced maneuverability of the differentially throttled vehicle 10 is provided about one of either the pitch or yaw axes while decreasing maneuverability about the other of the pitch or yaw axes. The configuration shown in FIGS. 6A and 6B, where engines 20, 24 have a negative tangential cant and engines 22, 24 have a positive tangential cant, enhances maneuverability about the pitch axis and decreases maneuverability about the yaw axis. The configuration shown in FIGS. 7A and 7B, where engines 20, 24 have a positive tangential cant and engines 22, 26 have a negative tangential cant, enhances maneuverability about the yaw axis and decreases maneuverability about the pitch axis. Therefore, the primary maneuver axis of the flight vehicle 10 is determined by how the engines 20, 22, 24, 26 are oriented relative to each other with either a positive or negative tangential cant.

The following moment equations illustrate the usefulness of nominal tangential canting to enhance maneuver axis control of a differentially throttled vehicle:

Roll mptac(ime)=Thme(ime)×(ryme(ime)×ezme(ime)−rzme(ime)×eyme(ime))

Pitch mptac(ime)=Thme(ime)×(rzme(ime)×exme(ime)−rxme(ime)×ezme(ime))

Yaw mptac(ime)=Thme(ime)×(rxme(ime)×eyme(ime)−ryme(ime)×exme(ime))

mptac=moment per throttle actuator (foot-pounds)
ime=index main engine (engines 1 through 4)
Thme=thrust main engine (pounds)
rxme, ryme, rzme=moment arms (feet)
exme, eyme, ezme=directional cosines The control enhancement may be demonstrated on any one of the engines 20, 22, 24, 26 by either of the moment equations for pitch or yaw where nominal tangential engine canting significantly increases the pitch or yaw differential throttling related moments. All moments are a function of the thrust of each of the engines 20, 22, 24, 26, and for purposes of demonstrating the advantage of nominally canting the engines by the above-identified moment equations, the thrust of a specific one of the engines is not particularly relevant in demonstrating that the enhancement about either the pitch or yaw axis is primarily due to the directional cosines along with the particular polarities of each of the engines 20, 22, 24, 26. One or more algorithms of a computer system onboard the flight vehicle 10 determines how to differentially control the thrust of each of the engines 20, 22, 24, 26 and, thus, control movement about the x, y and z axes.

Also, so long as all the engines 20, 22, 24, 26 are spaced radially an equal distance from the centerline 14 of the flight vehicle 10 and are equidistant apart from one another, the moment arms rxme will be the same for each equation and the moment arms ryme and rzme will have the same magnitude but differing sign depending upon location. In the two configurations shown in FIGS. 6A-6B and 7A-7B, for example, the moment arm rxme is 8, the moment arm ryme is only 1.5, and the moment arm rzme is also only 1.5. The moment rxme is positive when the engines 20, 22, 24, 26 are in front of the CG 12 along the length of the flight vehicle 10 as shown in FIGS. 6A-6B and 7A-7B. The moment rxme is negative when the engines 20, 22, 24, 26 are behind the CG 12 such as when the engines 20, 22, 24, 26 are on the bottom end of a flight vehicle.

Whether ryme and rzme are positive or negative values depends on where the corresponding engine is located on the y and z axes relative the centerline 14. The location of each of the engines 20, 22, 24, 26 along the y and z axes is best shown in FIGS. 6A and 7A. Engine 20 has a positive y component and a negative z component, engine 22 has positive y and z components, engine 24 has negative y component and a positive z component, and engine 26 has negative y and z components.

The directional cosines exme, eyme, and ezme, the projection of the engine thrust line 38 into the x, y and z axes, are determined by the cosines of the cant angle of the engines 20, 22, 24, 26 defined between the engine centerline 34 and the centerline 14 of the flight vehicle 10. For exme in the moment equations, the cosine of 5 degrees is 0.996 which is about 1. The magnitude of exme is roughly always 1 because the engine thrust line 38 is always substantially aligned with the centerline 14 of the flight vehicle 10. The magnitudes of both eyme and ezme is the sine of 5 degrees is 0.087 which is almost 0. If there had been no engine cant, exme would actually be 1 and eyme and ezme would actually be 0.

Once the magnitudes of the directional cosines are determined, the cant angle polarity of each of the engines 20, 22, 24, 26 can be used to determine whether the directional cosines are positive or negative. In other words, because of the nominal canting, a little thrust is put into the positive or negative y axis and the positive or negative z axis. For example, because thrust vectors are oriented opposite to the direction of the plumes from the engines 20, 22, 24, 26, it can be shown in FIGS. 6A and 6B that engine 20 has a thrust vector in the plus y and plus z directions. Therefore, eyme and ezme are both positive. Engine 22 has the opposite polarity of engine 20 with a thrust vector in the plus y direction and the negative z direction. Therefore, for engine 22, eyme is positive and ezme is negative. Engine 24 has a negative eyme and a negative ezme. Engine 26 has a negative eyme and a positive ezme. Whether the directional cosines of the engines 20, 22, 24, 26 in FIGS. 7A and 7B are positive or negative can also be determined by the direction of the thrust vectors. The directional cosine exme will always be positive for ell engines since the associated thrust vectors are approximately pointed in the forward direction. The rxme moment arm will always be positive when engine 20 is forward of the CG 12 as shown in FIGS. 6B and 7B. The various canting angle combinations cause the terms in the moment equations to have the same sign for either the pitch moment or for the yaw moment.

Still referring to the configuration of engines 20, 22, 24, 26 as shown in FIGS. 6A and 6B, the moment equation for pitch for engine 22 with a positive cant angle polarity has a positive rzme, a positive exme, a positive rxme, and a negative ezme. In the moment equation, the negative ezme is multiplied by rxme which results in a negative number but the moment equation then subtracts the product of rxme multiplied by the negative ezme. Subtracting the negative number results in a positive number and because rxme of 8 is multiplied by ezme of 0.087, 0.697 is then added to the product of the moment arm rzme multiplied by the exme (cosine of 5 degrees is approximately 1). Therefore, the two components of the pitch moment equation have the same sign for the pitch moment. This results in an overall increase in pitch moment due to the non-zero directional cosine ezme produced by the canting compared to a pitch moment without canting.

For the yaw moment equation of engine 22, in the configuration as shown in FIGS. 6A and 6B, the thrust may be the same value as it was for the pitch moment equation above. The moment arm rxme of 8 is multiplied by eyme which is 0.087. The product is 0.696. The product of the moment arm ryme of 1.5 multiplied by exme which is almost 1 is then subtracted from 0.696. Therefore, the two components of the yaw moment equation do not have the same sign for the yaw moment. Due to the smaller mptac, this results in a smaller yaw moment compared to the yaw moment if engine 22 had been uncanted. In such case, the movement about the yaw axis would be diminished.

More particularly for example, for engine 22 having thrust of 1,500 pounds and a positive engine cant of 5 degrees, the arithmetic is as follows for both the pitch and yaw moments:

Pitch mptac=1,500 lbs ((1.5 ft×0.966)−(8 ft×(−0.0870))

=1,500 lbs (1.449 ft+0.96 ft)

=1,500 lbs (2.145 ft)

=3217.5 ft-lbs

Yaw mptac=1,500 lbs ((8 ft×0.087)−(1.5 ft×0.996))

=1,500 lbs (0.696 ft−1.494 ft)

=1,500 lbs (−0.798)

=−1197 ft-lbs

Thus, the nominal canting of each of the engines 20, 22, 24, 26 takes advantage of the length of lever arm rxme in the longitudinal direction. The significance of this is that the moment arm rxme is about 8 feet from the CG 12 whereas the moment arms ryme and rzme are only 1.5 feet from the centerline 14. With 5 degree of engine canting, the eyme and ezme directional cosines are only about 0.087. The 0.087 directional cosines are multiplied by the rxme of 8 feet to get about 0.697. Therefore, on each individual engine, a nominal cant creates a multiplier effect due to inclusion of the rxme moment arm versus involvement of just the ryme and rzme moment arm ratios in the uncanted case.

Without the tangential canting, the pitch mptac would just be:

Pitch mptac=1,500 lbs×(1.5 ft×0.966)=2173.5 ft-lbs.

The enhancement about the pitch axis then is the difference between 3217.5 ft-lbs and the 2173.5 ft-lbs. Percentage wise, this is an increase in pitch moment of (3217.5−2173.5)/2173.5=48%. This is about a 48% increase in moment control compared to the uncanted case. The engines 20, 22, 24, 26, each having enhanced movement about either of the pitch and yaw axes, or diminished movement about the pitch and yaw axes, are coordinated through differential throttling by varying the thrust of each of the engines 20, 22, 24, 26, to control the attitude of the flight vehicle. The differences in thrust between each of the engines 20, 22, 24, 26 determines how much enhancement or diminished movement is provided to control the attitude of the flight vehicle 10.

The moment equation for roll is also disclosed above. Tangential canting enables roll control via differential throttling but there is no increase or decrease in the roll moment as a result of canting of the engines 20, 22, 24, 26 along with either pitch or yaw control enhancement because the roll moments about the centerline 14 of the flight vehicle 10 cancel each other out with either type of enhancement. The control moments of the engines 20, 22, 24, 26 when arranged as shown in FIGS. 7A and 7B can be determined in a similar manner as described above. In such case, it would be determined that the flight vehicle 10 with engines 20, 22, 24, 26 nominally canted as described above would have enhanced maneuverability about the yaw axis and decreased maneuverability about the pitch axis.

According to another embodiment disclosed herein, a system for providing enhanced control of a flight vehicle about either the pitch and yaw axes during flight is provided. The system includes a first engine of the flight vehicle having a first tangential cant such that a thrust line from the first engine is misaligned with a centerline of the flight vehicle in a tangential direction with respect to a circumference of the flight vehicle. The system further includes a second engine of the flight vehicle having a second tangential cant such that a thrust line from each of the second plurality of engines is misaligned with the centerline of the flight vehicle in a tangential direction with respect to a circumference of the flight vehicle. The first and second engines are spaced equidistant from one another and from the centerline of the flight vehicle and are configured for differential throttling to control attitude of the flight vehicle. The first and second tangential cants of the first and second engines are equal but opposite thereby enhancing movement of the flight vehicle about one of the pitch and yaw axes. The system may also include a third engine having a third tangential cant, wherein the first, second and third tangential cants are equal and cancel one another out.

Figure 10:
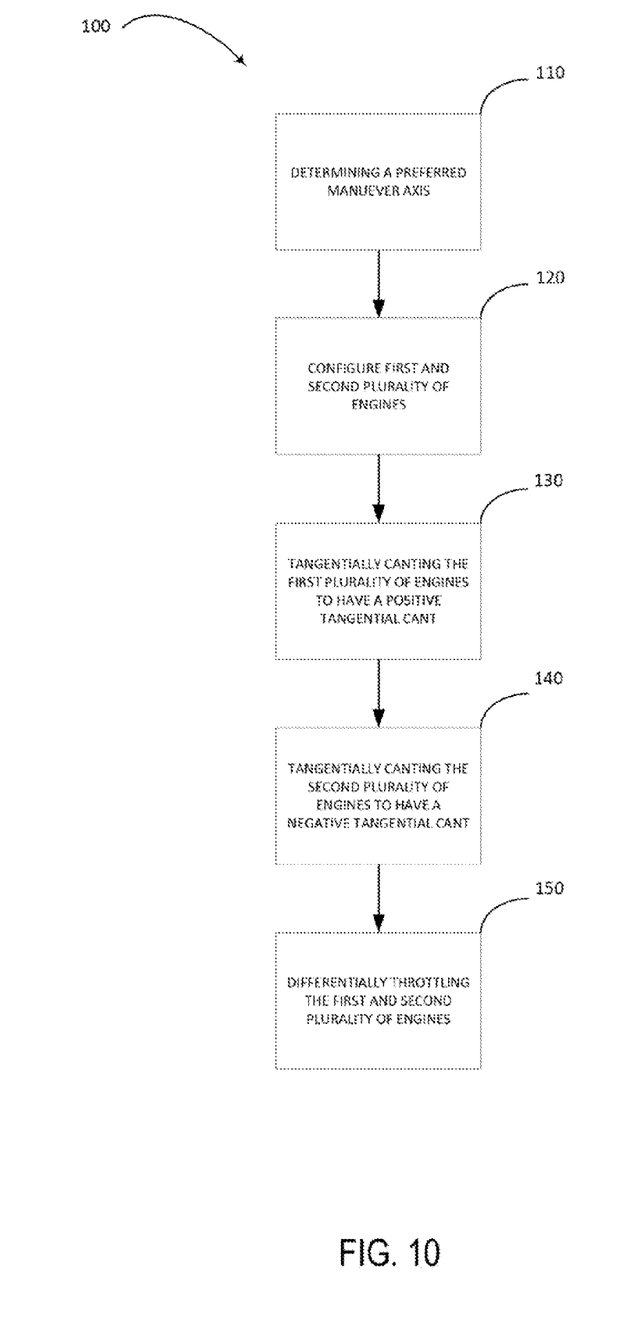
FIG. 10 illustrates one embodiment of a routine for enhancing either the pitch or the yaw moments according to at least one embodiment disclosed herein.

FIG. 10 illustrates routine 100 for enhancing one of pitch and yaw control of a flight vehicle during flight. Unless otherwise indicated, more or fewer operations may be performed than shown in the figures and described herein. Additionally, unless otherwise indicated, these operations may also be performed in a different order than those described herein.

The routine 100 starts at operation 110, where a preferred maneuver axis of the flight vehicle is determined. In operation 120, in response to determining a preferred maneuver axis, first and second plurality of engines of the flight vehicle are configured. Operation 130 includes tangentially canting the first plurality of engines of the flight vehicle to have a positive tangential cant such that thrust lines of the first plurality of engines are not parallel to a centerline of the flight vehicle. Operation 140 includes tangentially canting the second plurality of engines of the flight vehicle to have a negative tangential cant such that thrust lines of the second plurality of engines are not parallel to the centerline of the flight vehicle. In operation 150, the first and second plurality of engines are differentially throttled to control attitude of the flight vehicle about pitch, yaw and roll axes. Routine 100 may also include diminishing movement of the flight vehicle about an axis other than the preferred maneuver axis.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A system for providing enhanced control of a flight vehicle about either the pitch or yaw axes during flight, comprising:
a first plurality of engines of the flight vehicle having a positive tangential cant such that a thrust line from each of the first plurality of engines is misaligned with a centerline of the flight vehicle in a tangential direction with respect to a circumference of the flight vehicle; and a second plurality of engines of the flight vehicle having a negative tangential cant such that a thrust line from each of the second plurality of engines is misaligned with the centerline of the flight vehicle in a tangential direction with respect to a circumference of the flight vehicle and opposite to the first plurality of engines, wherein the first and second plurality of engines are spaced equidistant from one another and from the centerline of the flight vehicle, each of the first plurality of engines alternately positioned relative to each of the second plurality of engines, and the first and second plurality of engines configured for differential throttling to control attitude of the flight vehicle about pitch, yaw and roll axes wherein the positive and negative tangential cants of the first and second plurality of engines enhance movement of the flight vehicle about one of the pitch and yaw axes.

2. The system of claim 1, wherein the positive and negative tangential cants of the first and second plurality of engines diminish movement of the flight vehicle about the other one of the pitch and yaw axes due to the positive and negative tangential cants of the first and second plurality of engines.

3. The system of claim 1, wherein at least one of the first plurality of engines and at least one of the second plurality of engines are configured to operate at a first thrust level and at least one other of the first plurality of engines and at least one other of the second plurality of engines are configured to operate at a second thrust level that is different from the first thrust level.

4. The system of claim 3, wherein the flight vehicle performs at a level of maneuverability about one of the pitch and yaw axes with the first and second plurality of engines having the positive and negative tangential cants, and wherein more thrust than at least one of the first thrust level and the second thrust level would be required for the flight vehicle to perform at the level of maneuverability about one of the pitch and yaw axes without the first and second plurality of engines having the positive and negative tangential cants.

5. The system of claim 1, wherein engine centerlines of both the first and second plurality of engines are misaligned by about 2 degrees to about 10 degrees relative to the centerline of the flight vehicle.

6. The system of claim 1, wherein engine centerlines of both the first and second plurality of engines are misaligned by about 5 degrees relative to the centerline of the flight vehicle.

7. The system of claim 1, further comprising a moment partially defined by a directional cosine relative to the centerline of the flight vehicle and an engine centerline of each of the first and second plurality of engines.

8. The system of claim 1, wherein the first plurality of engines includes two engines with the positive tangential cant and the second plurality of engines includes two engines with the negative tangential cant.

9. The system of claim 1, wherein the first and second plurality of engines are fixed relative the centerline of the flight vehicle.

10. The system of claim 1, wherein the first and second plurality of engines are not dynamically canted during flight.

11. The system of claim 1, wherein the flight vehicle is without gimbaling.

12. The system of claim 1, wherein a center of mass of the vehicle corresponds with the centerline of the flight vehicle.

13. The system of claim 1, wherein the first and second plurality of engines are forward of a center of mass of the flight vehicle.

14. The system of claim 1, wherein the first and second plurality of engines are behind a center of mass of the flight vehicle.

15. The system of claim 1, wherein the flight vehicle is an air launched vehicle.

16. The system of claim 1, wherein the flight vehicle is a ground launched vehicle.

17. The system of claim 1, wherein the vehicle is a symmetric flight vehicle.

18. A method for enhancing one of pitch and yaw control of a flight vehicle during flight, the method comprising:
  determining a preferred maneuver axis of the flight vehicle;
  in response to determining a preferred maneuver axis, configuring a first and second plurality of engines of the flight vehicle by:
    alternately positioning the first and second plurality of engines of the flight vehicle relative to one another;
    tangentially canting the first plurality of engines of the flight vehicle to have a positive tangential cant relative a circumference of the flight vehicle such that thrust lines of the first plurality of engines are not parallel to a centerline of the flight vehicle; and
    tangentially canting the second plurality of engines of the flight vehicle to have a negative tangential cant relative a circumference of the flight vehicle and opposite to the first plurality of engines such that thrust lines of the second plurality of engines are not parallel to the centerline of the flight vehicle; and
  differentially throttling the first and second plurality of engines to control attitude of the flight vehicle about pitch, yaw and roll axes.

19. The method of claim 18, further comprising diminishing movement of the flight vehicle about an axis other than the preferred maneuver axis.

20. The method of claim 18, wherein configuring the first and second plurality of engines further comprises eliminating roll about the centerline of the flight vehicle with the positive tangential cant of the first plurality of engines counteracting the negative tangential cant of the second plurality of engines.

21. The method of claim 18, wherein tangentially canting the first and second plurality of engines comprises misaligning thrust lines of the first and second plurality of engines by about 2 degrees to about 10 degrees relative to the centerline of the flight vehicle.

22. The method of claim 18, wherein tangentially canting the first and second plurality of engines comprises misaligning thrust lines of the first and second plurality of engines by about 5 degrees relative to the centerline of the flight vehicle.

23. The method of claim 18, further comprising operating at least one of the first plurality of engines and at least one of the second plurality of engines at a first thrust level and at least one other of the first plurality of engines and at least one other of the second plurality of engines at a second thrust level that is different from the first thrust level.

24. The method of claim 23, wherein the flight vehicle performs at a level of maneuverability about one of the pitch and yaw axes with the first and second plurality of engines having the positive and negative tangential cants, and wherein more than at least one of the first thrust level and the second thrust level would be required for the flight vehicle to perform at the level of maneuverability about one of the pitch and yaw axes without the first and second plurality of engines having the positive and negative tangential cants.

25. The method of claim 18, wherein tangentially canting the first and second plurality of engines comprises generating a moment partially defined by a directional cosine relative the centerline of the flight vehicle and an engine centerline of each of the first and second plurality of engines.

26. The method of claim 18, wherein tangential canting the first and second plurality of engines comprises generating a moment, relative the centerline of the flight vehicle, that is partially defined by a directional cosine, and that is greater than if the first and second plurality of engines were without tangential canting.

27. A system for providing enhanced control of a flight vehicle about one of pitch and yaw axes during flight, comprising:
   a first plurality of engines of the flight vehicle having a positive tangential cant relative a circumference of the flight vehicle such that thrust lines from the first plurality of engines are not parallel to a centerline of the flight vehicle; and
   a second plurality of engines of the flight vehicle having a negative tangential cant relative a circumference of the flight vehicle and opposite to the first plurality of engines such that thrust lines from the second plurality of engines are not parallel to the centerline of the flight vehicle, wherein the first and second plurality of engines are alternately positioned relative to one another,
   wherein the flight vehicle has a center of mass substantially corresponding with the centerline of the flight vehicle,
   wherein the tangential canting of the first and second plurality of engines generates a moment partially defined by directional cosines relative the centerline of the flight vehicle and an engine centerline of each of the first and second plurality of engines, and
   wherein the first and second plurality of engines are differentially throttled to control attitude of the flight vehicle about pitch, yaw and roll axes.

28. The system of claim 27, wherein the first and second plurality of engines are fixed relative to the centerline of the flight vehicle to preclude dynamic canting during flight.

* * * * *